Figure 1:
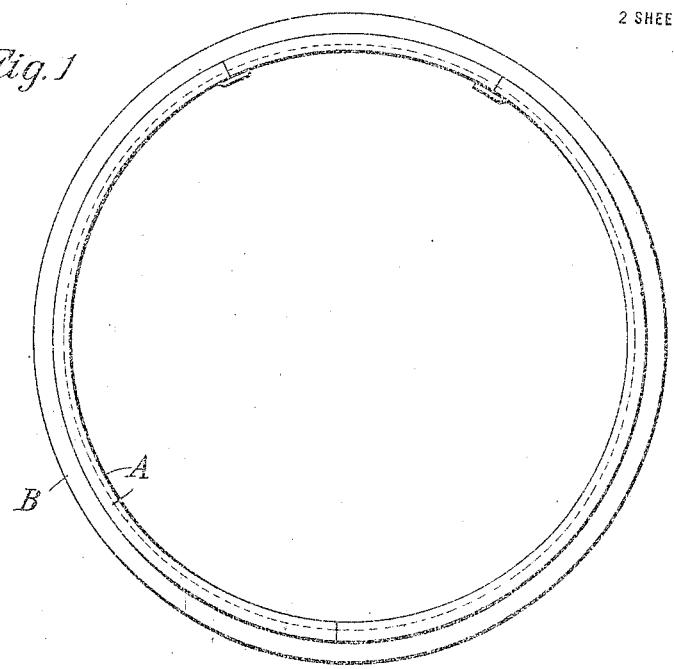

E. HOPKINSON.
TIRE CARRYING RIM.
APPLICATION FILED AUG. 2, 1911.

1,204,019.

Patented Nov. 7, 1916.
2 SHEETS—SHEET 1.

Witnesses:
Raphael Netter
Harry E. Phillips

Inventor
Ernest Hopkinson

E. HOPKINSON.
TIRE CARRYING RIM.
APPLICATION FILED AUG. 2, 1911.
1,204,019.
Patented Nov. 7, 1916.
2 SHEETS—SHEET 2.
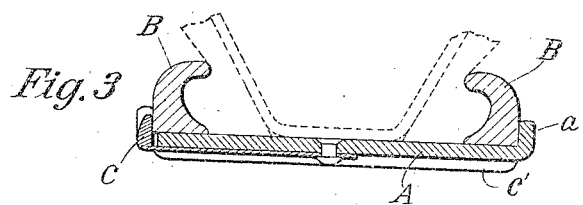
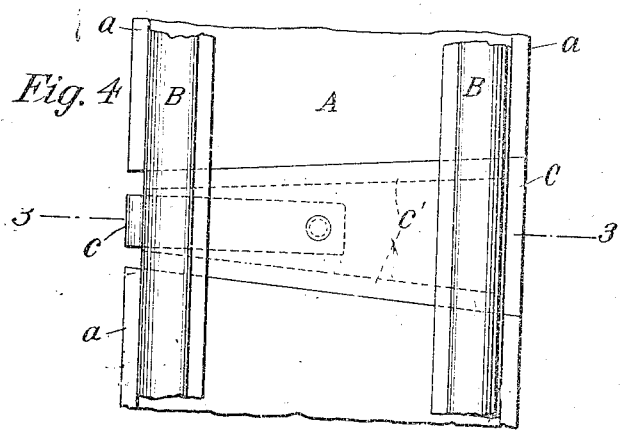
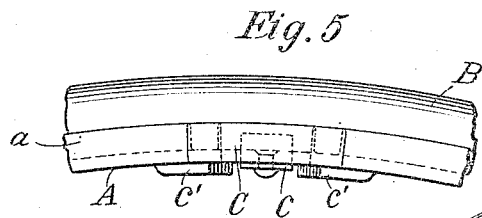
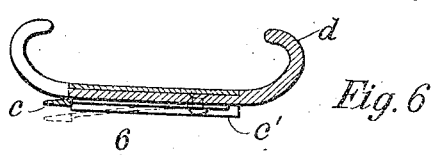
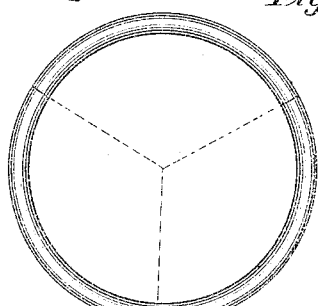
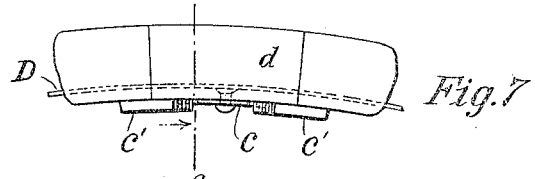
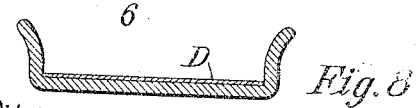
Witnesses:
Raphael Netter
Henry E. Phillips
Inventor
Ernest Hopkinson

UNITED STATES PATENT OFFICE.

ERNEST HOPKINSON, OF EAST ORANGE, NEW JERSEY.

TIRE-CARRYING RIM.

1,204,019.  Specification of Letters Patent.  Patented Nov. 7, 1916.

Application filed August 2, 1911. Serial No. 641,910.

*To all whom it may concern:*

Be it known that I, ERNEST HOPKINSON, a citizen of the United States of America, residing at East Orange, New Jersey, have invented a certain new and useful Tire-Carrying Rim, of which the following is a specification.

The object of the present invention is to provide a tire-carrying rim, cheap of manufacture and efficient in operation, and capable of use in connection with both clencher and straight-sides tires. By "tire-carrying rim" I mean a construction which is adapted to carry a tire in an inflated condition, to be placed upon the felly band of a wheel, and there secured by any suitable means in such a manner as to be easily removable.

In the drawings I have illustrated a construction embodying the principles of my invention; although it will be understood that I do not limit myself to the precise construction described and shown.

Figure 2:
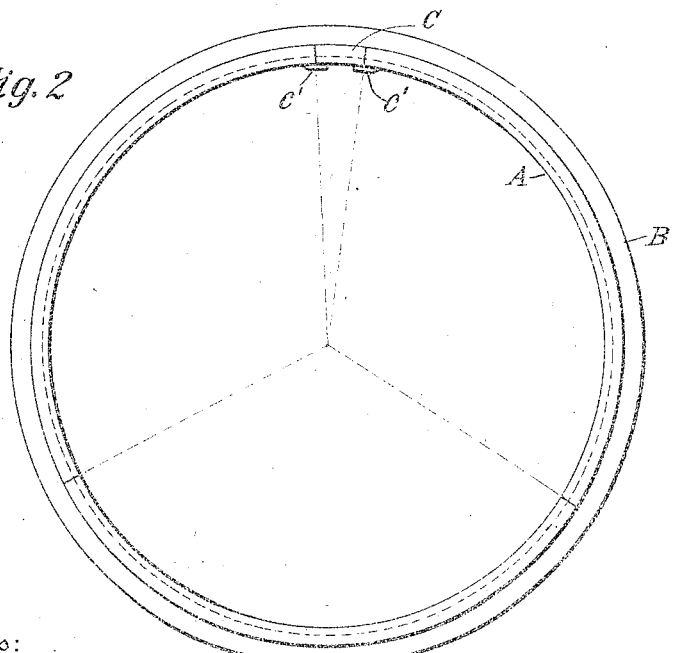

In the drawings, Figure 1 is a side view of the entire structure. Fig. 2 is a view similar to Fig. 1, showing a slightly modified form. Fig. 3 is the cross-section along line 3—3 of Fig. 4. Fig. 4 is a fragmentary plan view. Fig. 5 is a side elevation of a portion of the construction showing the wedge. Fig. 6 is a sectional view of a modification along line 6—6 of Fig. 7. Fig. 7 is a side view of the modification shown in Fig. 6. Fig. 8 is the view in cross-section of the same general principle embodied in Figs. 6 and 7, but adapted for use in connection with a tire having straight sides. Fig. 9 is a cross-sectional view of the rim shown in Fig. 10. Fig. 10 is a side view of a complete rim of the construction shown in Fig. 9.

Referring to Figs. 1, 2, 3, 4 and 5, "A" designates what I term the base portion of the rim which is provided with side flanges "a". This base portion is preferably divided into a plurality of arc sections, which are formed by rolling a piece of metal stock of suitable cross-sectional shape into circular form and then cutting the curled up stock on a line coinciding with the radius of a circle formed by the rolled metal, as indicated in dotted lines in Fig. 2. In the construction of the figures referred to I provide two tire-flanges, or tire-flange rings, "B". These flanges are in the form of endless rings and of the usual construction, adapted on one side to co-act with a clencher tire and on the opposite side to co-act with a tire having straight sides. "C" designates a key-piece which is provided on one side with a flange similar to the flanges "a" and on the opposite side with a spring stop or latch "c". I provide guides c' on the under side of the ends of the arc sections adjacent the key-piece "C". It will be noted that the arc section and the key-piece when fitted together in close contact complete a true circle fitting underneath or within the endless rings B and that the key-piece C by the operation of being forced home simply compels close contact and abutment between the ends of the arc sections without springing or straining them. The preferred form of construction is the one illustrated in Figs. 2, 3 and 4, in which the base portion is divided into three main arc sections and a key piece. In this construction, when assembling the parts, I first place the rings in position adjacent the edges of the tire shoe, which, of course, has the usual inner tube located in proper position. I then place the lowermost arc section in position embracing the two tire flanges and the inclosed tire between the flanges "a". I then successively place the two remaining sections in position and finally insert the key piece which I drive home, thus causing the arc sections of the base portion to abut end to end and form a true circle underneath or within the endless rings "B." When the key piece is home the spring stop or latch "c" snaps into position behind one of the rings "B". It will be seen, therefore, that, as the rings "B" limit the outward movement of the arc sections, these sections, together with the key piece, form a complete circle, which cannot be collapsed without removing the key piece. In other words, the ends of each of the sections being cut on a radius of the circle they cannot pass each other toward the center, but each arc section gives end-to-end support to the two adjacent sections. By this means I am enabled to obviate the necessity of any permanent connection between the arc sections, which are in fact independent, disconnected arc sections and are therefore capable of being independently placed in position, which greatly facilitates assembling and obviates considerable cost in manufacture, while at the same time affords a structure which is amply strong and safe. The foregoing structure is one specially designed to interchangeably coöperate with either a tire having a clencher hook along each of its edges or a tire having straight sides and an inextensible band embodied in its edge.

In Figs. 6, 7 and 8 I have shown two forms of rim, each of which is specifically adapted for a particular form of tire. In Figs. 6 and 7 the rim is adapted only for use with a clencher tire, while in Fig. 8 the rim is designed for a tire having straight sides. In the construction illustrated in these figures I use an endless band "D" for the purpose of limiting movement of the rim sections in a radial direction. In Fig. 6, which illustrates a clencher rim, the band extends only across the flat portion of the rim, while in Fig. 8 I have shown the band extending the entire width of the base. In Figs. 6 and 7, "d" represents the key member. This key member consists of a portion of the rim having inclined sides similar to the key member "C" except that the clencher hook is cut away at the entering end of the key piece. The key piece in this construction operates in the same way as the key piece "C," except that the spring latch "c" locks behind lugs or guides c'.

In Figs. 9 and 10 the inextensible edges of the tire shoe constitute the means for limiting movement in a radial direction of the arc sections, and are therefore substantially the equivalent of the endless band "D" of Figs. 6, 7 and 8 and the rings "B" of the other views of the drawing. In Figs. 9 and 10 I have illustrated the rim as simply cut in three sections, without any wedge piece. I have found that this construction will operate in actual practice, although not as easily operable as the construction involving the use of a key piece.

It will be noted that in the preferred form of the invention, that is, the construction illustrated in Figs. 1 to 5 inclusive, the rim may be disassociated by simply withdrawing the key piece and without the necessity of moving the rings "B" toward the middle of the base of the tire, which is necessary in removing tires from most of the separable rims in commercial use. Again, in disassociating the rim, it is not required to move one of the metal parts in contact with another metal part for any extended length, the arc sections, after the removal of the key piece, being easily withdrawn from under or within the rings "B" by an angular movement, one end of the arc section acting as a center about which the other end moves in the arc of a circle.

What is claimed as new is:

1. A tire carrying rim for a pneumatic tire whose casing has inextensible edges, said rim comprising separate endless external tire rings, a plurality of separable disconnected arc sections, each consisting of a base portion and side flanges, each of said sections having radially abutting ends, adapted to be held in contact solely by the pressure of inflation of the tire acting on said base and flanges.

2. A rim for pneumatic tires having inextensible edges, comprising more than two independent arc sections, separable endless tire flanges located exteriorly of said arc sections, and a key piece between two of said arc sections for holding the sections in the form of a circle immediately within said tire flanges.

3. A rim for pneumatic tires having inextensible edges, comprising more than two independent arc sections, separable endless tire flanges located exteriorly of said arc sections, and a laterally insertible key piece between two of said arc sections for holding the sections in the form of a circle immediately within said tire flanges.

4. A rim for pneumatic tires having inextensible edges, comprising more than two independent arc sections, separable endless tire flanges located exteriorly of said arc sections, one of said sections being wedge shaped and forming a laterally movable key piece for holding the sections in the form of a circle immediately within said tire flanges.

5. A rim for pneumatic tires having inextensible edges, comprising more than two independent arc sections, and a separable endless ring located exteriorly of said arc sections, one of said arc sections constituting a laterally movable key piece for holding the sections in the form of a circle immediately within said endless ring and when displaced permitting radial removal or insertion of the remaining arc sections.

6. A tire-carrying rim, comprising more than two independent disconnected arc sections, each section consisting of a base portion and side flanges, an endless tire ring surrounding the arc sections, one of said sections constituting a wedge piece located between two arc sections.

7. A tire-carrying rim, comprising more than two independent disconnected arc sections, each having a base portion and side flanges, one end of each of the two arc sections being laterally inclined, one arc section constituting a wedge member located between said inclined ends, and an independent endless ring surrouding the arc sections.

8. A tire-carrying rim comprising two independent disconnected arc sections each of which consists of a base portion and side flanges, a wedge or bridge piece between the two arc sections and two endless tire flanges surrounding the arc sections.

9. A tire-carrying rim comprising a base portion having side flanges said portion being in the form of a broken ring, a wedge piece adapted to bridge a break in the broken ring, said wedge piece being adapted to enter the break in the broken ring in a lateral direction, and a stop or latch for preventing movement of the wedge piece.

In testimony whereof I affix my signature in the presence of two witnesses.

ERNEST HOPKINSON.

Witnesses:
B. V. MOHAN,
HENRY E. PHILLIPS.